(12) United States Patent
Ekshinge et al.

(10) Patent No.: US 12,031,769 B2
(45) Date of Patent: Jul. 9, 2024

(54) ATTACHMENT ASSEMBLY FOR AN INSULATED DOOR

(71) Applicant: WHIRLPOOL CORPORATION, Benton Harbor, MI (US)

(72) Inventors: Sunil S. Ekshinge, Pune (IN); Lynne Foster Hunter, Dorr, MI (US); Sai B. Krishna, Bangalore (IN); Omkar Sunil Mithari, Pune (IN); Abhay Naik, Stevensville, MI (US); Abinash Sarma, Tinsukia (IN)

(73) Assignee: Whirlpool Corporation, Benton Harbor, MI (US)

( * ) Notice: Subject to any disclaimer, the term of this patent is extended or adjusted under 35 U.S.C. 154(b) by 344 days.

(21) Appl. No.: 17/475,487

(22) Filed: Sep. 15, 2021

(65) Prior Publication Data

US 2023/0078837 A1    Mar. 16, 2023

(51) Int. Cl.
*F25D 23/02* (2006.01)

(52) U.S. Cl.
CPC .......... *F25D 23/02* (2013.01); *F25D 2201/14* (2013.01)

(58) Field of Classification Search
CPC ........ F25D 23/04; F25D 23/028; F25D 23/02; F25D 23/066; F25D 23/067; F25D 2201/14
See application file for complete search history.

(56) References Cited

U.S. PATENT DOCUMENTS

| | | | |
|---|---|---|---|
| 8,701,374 B2 | 4/2014 | Becke et al. | |
| 9,752,821 B2* | 9/2017 | Seeley | F25D 23/067 |
| 9,863,690 B1* | 1/2018 | Demiroez | F25D 23/04 |
| 9,879,900 B1* | 1/2018 | Ammerman | F25D 23/04 |
| 10,168,093 B2 | 1/2019 | Eom et al. | |
| 10,328,822 B2* | 6/2019 | Bachman | B60N 2/1615 |
| 10,746,343 B2* | 8/2020 | Allard | F25D 23/066 |
| 11,162,731 B2* | 11/2021 | Aranda | F25D 23/087 |
| 2012/0018435 A1 | 1/2012 | Kim | |
| 2012/0293056 A1* | 11/2012 | Kim | F25D 23/04 312/405.1 |
| 2020/0348072 A1 | 11/2020 | Allard et al. | |

FOREIGN PATENT DOCUMENTS

| | | |
|---|---|---|
| CN | 110487702 A | 11/2019 |
| KR | 20180009243 A | 1/2018 |
| KR | 20190010383 A | 1/2019 |
| KR | 102273092 B1 | 7/2021 |
| WO | 2018063182 A1 | 4/2018 |

OTHER PUBLICATIONS

Translation of Cite No. 1 of Jan. 13, 2023 IDS to Jung (20190010383), Jan. 2019.*

* cited by examiner

*Primary Examiner* — Brian E Glessner
*Assistant Examiner* — Daniel J Kenny
(74) *Attorney, Agent, or Firm* — Price Heneveld LLP

(57) ABSTRACT

An insulated structure includes a door that has a liner and a wrapper. The liner defines at least one channel. At least one attachment feature is disposed within the at least one channel defined by the liner and coupled to the door. The at least one attachment feature includes a body that has a plurality of apertures that are defined along a length of the body. A bin is operably coupled to the door via the at least one attachment feature. The bin includes a coupling feature that extends through at least one of the plurality of apertures that are defined by the body.

20 Claims, 15 Drawing Sheets

ATTACHMENT ASSEMBLY FOR AN INSULATED DOOR

BACKGROUND OF THE DISCLOSURE

The present disclosure generally relates to an insulated door, and more specifically, to an attachment feature for an insulated door.

SUMMARY OF THE DISCLOSURE

According to one aspect of the present disclosure, a vacuum insulated structure for an appliance includes a wrapper and a liner that is operably coupled to the wrapper to define an insulation cavity. The liner defines a first channel and a second channel along an attachment surface of the liner. The vacuum insulated structure further includes a trim breaker that is coupled to the liner and the wrapper to further define the insulation cavity, and an attachment assembly that is operably coupled to the attachment surface of the liner proximate the trim breaker. The attachment assembly includes a first attachment feature that is disposed within the first channel and a second attachment feature that is disposed within the second channel. A bin is operably coupled to the liner via the attachment assembly.

According to another aspect of the present disclosure, an insulated structure includes a door that has a liner and a wrapper. The liner defines at least one channel. At least one attachment feature is disposed within the at least one channel defined by the liner and coupled to the door. The at least one attachment feature includes a body that has a plurality of apertures that are defined along a length of the body. A bin is operably coupled to the door via the at least one attachment feature. The bin includes a coupling feature that extends through at least one of the plurality of apertures that are defined by the body.

According to yet another aspect of the present disclosure, an insulated door includes a first panel, a second panel that is operably coupled to the first panel to define an insulation cavity, a trim breaker that is coupled to the first panel and the second panel, and an attachment feature that is operably coupled to the second panel adjacent the trim breaker. The attachment feature has a body and defines a plurality of apertures along the body. The insulated door further includes a false panel that is operably coupled to the attachment feature and is configured to at least partially conceal the second panel.

Integrated channels within a liner can receive an attachment assembly, which may assist in the stabilization of the insulated structure. The attachment assembly may extend outward from the panel and a false panel can be coupled to the attachment assembly and/or the liner to define a coplanar configuration with the attachment assembly. The coplanar configuration assists in the overall general stabilization of a bin that may be coupled to a door of an appliance via an insulated structure. The attachment assembly may be coplanar with either the false panel and/or the liner to assist in the stabilization of the liner and attachment of the bin.

These and other features, advantages, and objects of the present disclosure will be further understood and appreciated by those skilled in the art by reference to the following specification, claims, and appended drawings.

Figure 1:
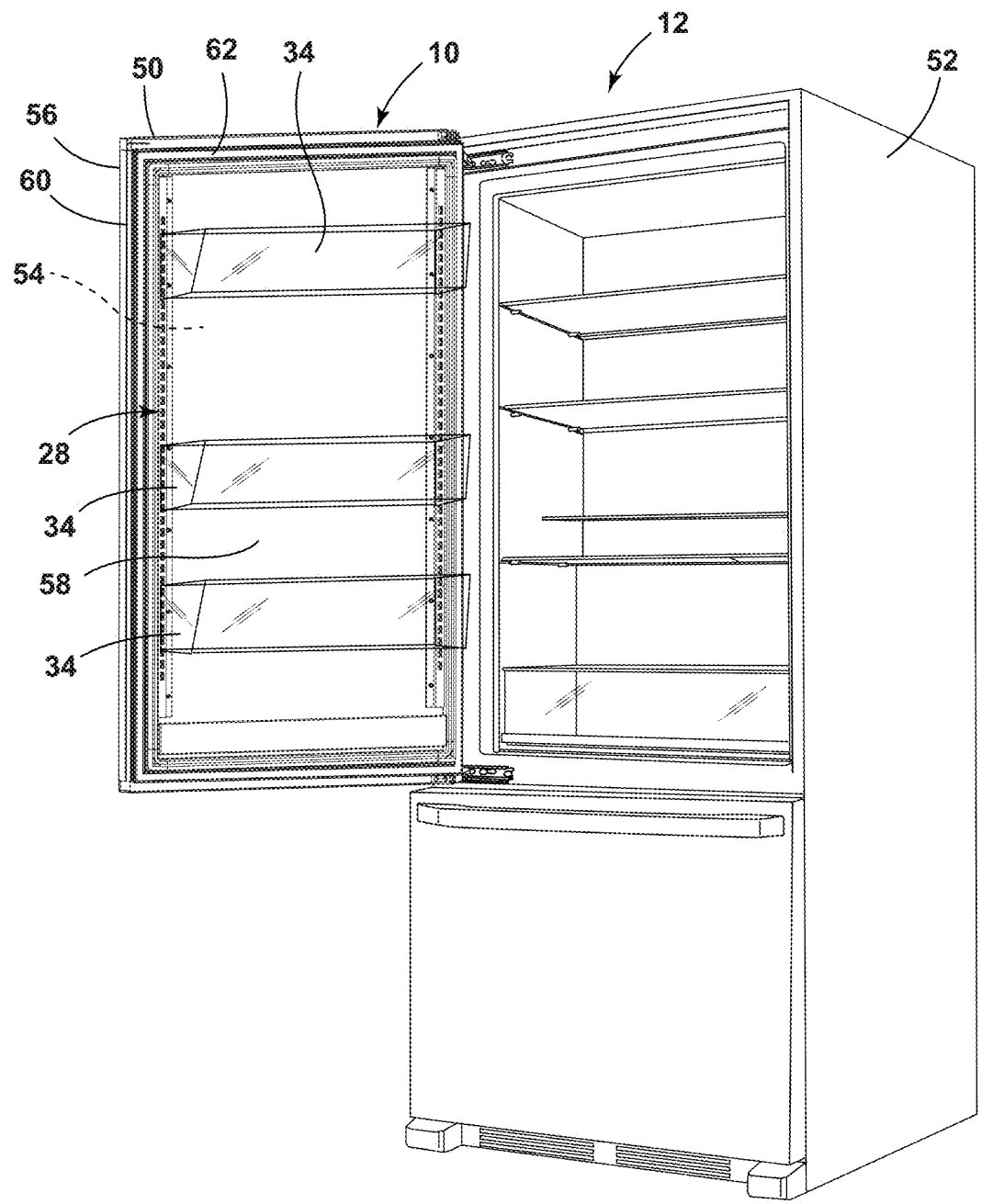
FIG. 1 is a front perspective view of an appliance of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an attachment assembly for an insulated door. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-15, reference numeral 10 generally designates a vacuum insulated structure for an appliance 12 that includes a wrapper 14, and a liner 16. The liner 16 is operably coupled to the wrapper 14 to define an insulation cavity 18. The liner 16 defines a first channel 20 and the second channel 22 along an attachment surface 24 of the liner 16. A trim breaker 26 is coupled to the liner 16 and the wrapper 14 to further define the insulation cavity 18. An attachment assembly 28 is operably coupled to the attachment surface 24 of the liner 16 proximate to the trim breaker 26. The attachment assembly 28 includes a first attachment feature 30 disposed within the first channel 22 and a second attachment feature 32 disposed within the second channel 22. A bin 34 is operably coupled to the liner 16 via the attachment assembly 28.

Figure 2:
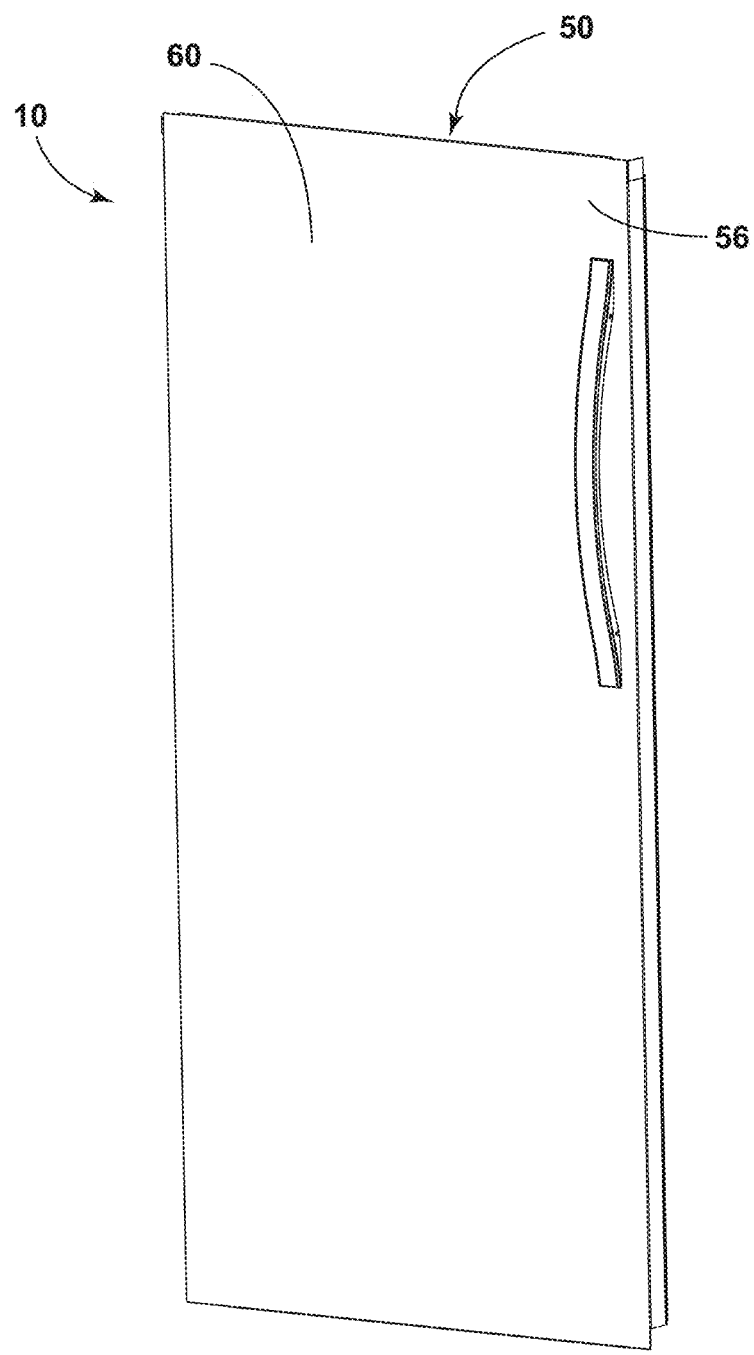
FIG. 2 is a side perspective view of a door of the present disclosure with an insulated structure and an attachment assembly.
Figure 3:
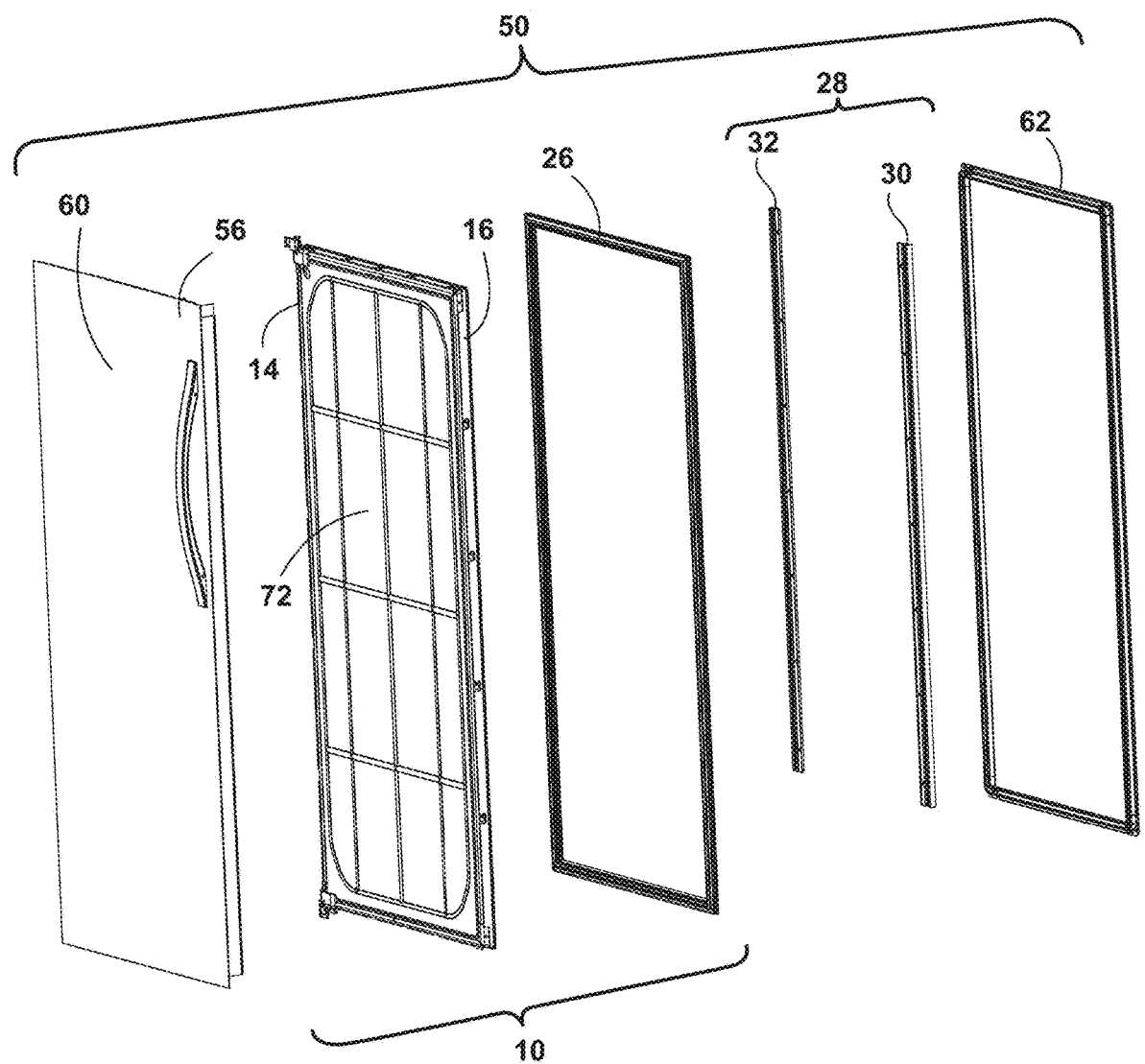
FIG. 3 is an exploded side perspective view of the door of FIG. 2.

Referring now to FIGS. 1-3, the appliance 12 is illustrated as a refrigerating appliance. It is also contemplated that the vacuum insulated structure 10 described herein may be used with a variety of appliances and/or other structures in which vacuum insulation may be advantageous. It is further contemplated that the vacuum insulated structure 10 described herein may be configured as a vacuum insulated structural cabinet or a vacuum insulated panel, as illustrated, that may be used as an insulation member for the appliance 12 and/or a door 50 for the appliance 12. The door 50 is operably coupled to an outer cabinet 52 of the appliance 12, which may be disposed around the vacuum insulated structure 10. The door 50 is generally formed from the wrapper 14 and the liner 16 to define the insulation cavity 18 therebetween. The wrapper 14 and the liner 16 may alternatively be referred to as a first panel and a second panel, respectively, and collectively as first and second panels.

It is generally contemplated that the first and second panels 14, 16 may be formed from metals, polymers, metal alloys, combinations thereof, and other substantially rigid materials that can be used for vacuum insulated structures within appliances. It is generally contemplated that insulation materials 54 may be disposed within the insulation cavity 18 defined between the first and second panels 14, 16. The insulation materials 54 may be a glass type material, a carbon-based powder, silicone oxide based materials, insulating gases, and other standard insulation materials practicable for use in a vacuum insulated structure 10. The insulation materials 54 substantially fill the insulation cavity 18 to form a substantially continuous layer between the first and second panels 14, 16. The insulation cavity 18 is evacuated by a vacuum to further define the vacuum insulated structure 10. It is also contemplated that the attachment assembly 28, described herein may be utilized with an insulated structure 10 that may be free from a vacuum.

Referring still to FIGS. 1-3, the door 50 includes an outer portion 56 and an inner portion 58. The door 50 can include an outer shell 60 that may be disposed around the first panel 14 to generally conceal the first panel 14 and define the outer portion 56 of the door 50. It is generally contemplated that the outer portion 56 is defined by the outer shell 60, and the inner portion 58 is defined, at least in part, by the second panel 16. The outer shell 60 may wrap around the first panel 14 and be coupled to the trim breaker 26. It is contemplated that the trim breaker 26, while partially concealed by the outer shell 60, may be at least partially concealed by a seal member 62 disposed around a perimeter 64 of the inner portion 58 of the door 50.

Referring to FIGS. 3-6, the trim breaker 26 includes a first receiving portion 66 and a second receiving portion 68 in which the first and second panels 14, 16 are respectively received. The first panel 14 and the second panel 16 each include a peripheral flange 70. The peripheral flange 70 of the first and second panels 14, 16 is received within the first and second receiving portions 66, 68 of the trim breaker 26, respectively. The peripheral flanges 70 of the first and second panels 14, 16 can be coupled to the trim breaker 26 via an adhesive or other binding member. As mentioned above, the coupling of the first and second panels 14, 16 to the trim breaker 26 defines the insulation cavity 18. The adhesive and/or other binding member seals the trim breaker 26 with the first and second panels 14, 16 to seal, at least in part, the insulation cavity 18. It is generally contemplated that a first side 72 of each of the first and second panels 14, 16 is generally exterior relative to the insulation cavity 18, and a second side 74 of each of the first and second panels 14, 16 at least partially defines the insulation cavity 18. Stated differently, the first side 72 of the second panel 16 generally defines the inner portion 58 of the door 50. The inner portion 58 of the door 50 is further defined, in part, by the trim breaker 26 and the attachment assembly 28.

It is generally contemplated that the first side 72 of the second panel 16 may be referred to as the attachment surface 24, mentioned above. Stated differently, the attachment assembly 28 is configured to be disposed along and coupled to the attachment surface 24 of the second panel 16. It is further contemplated that the second panel 16 has a central portion 76 of the attachment surface 24 that may be defined by the placement of the attachment assembly 28 along the attachment surface 24. The peripheral flange 70 of the second panel 16 may also partially define the central portion 76, such that the central portion 76 is central relative to the peripheral flange 70. As described in more detail below with respect to FIGS. 10-12, a perimeter channel 78 may also be defined along the attachment surface 24 proximate to the peripheral flange 70 further defining the central portion 76.

Figure 4:
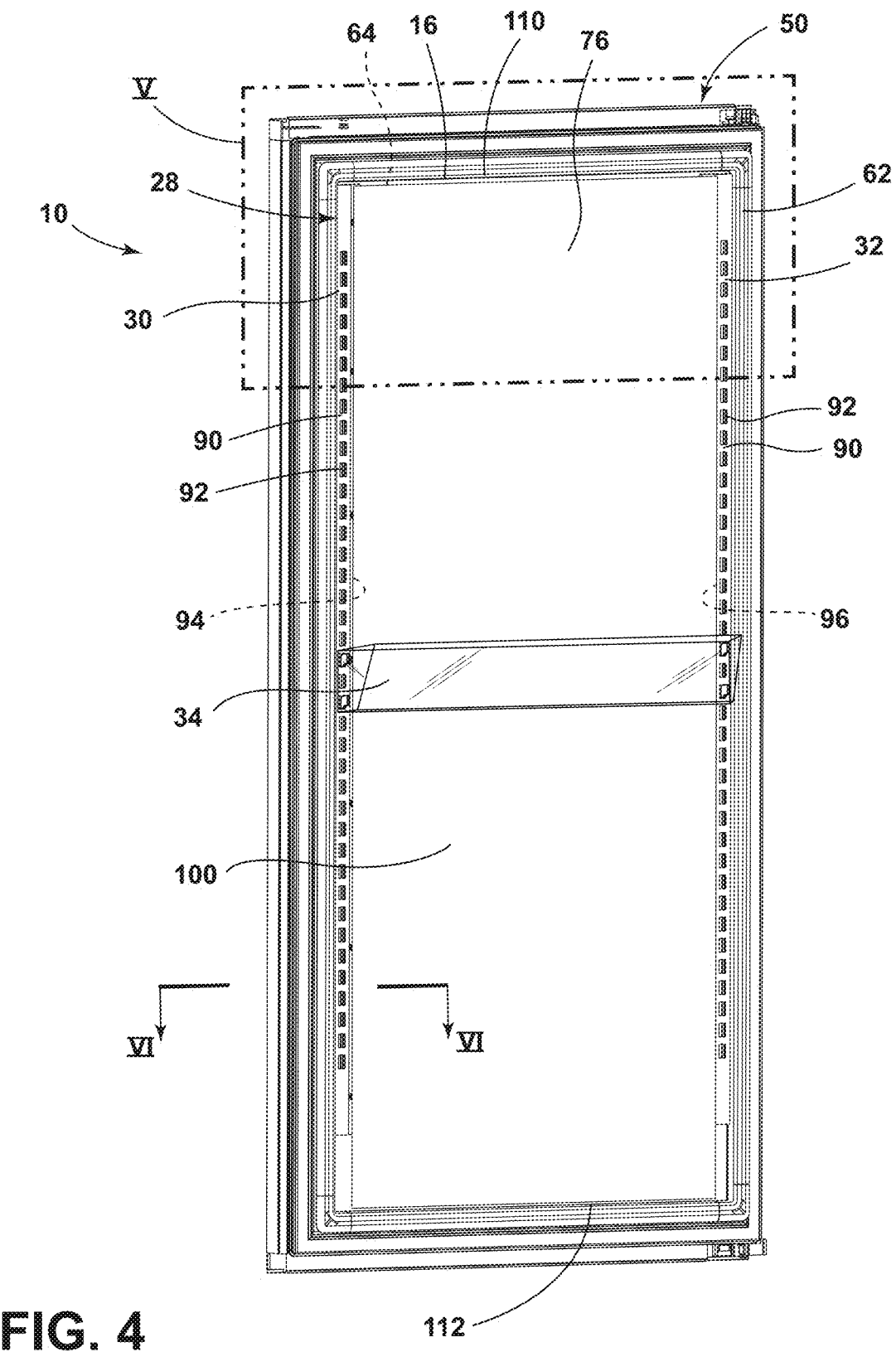
FIG. 4 is a top perspective view of an insulated structure of the present disclosure in a door and with an attachment assembly of the present disclosure.
Figure 5:
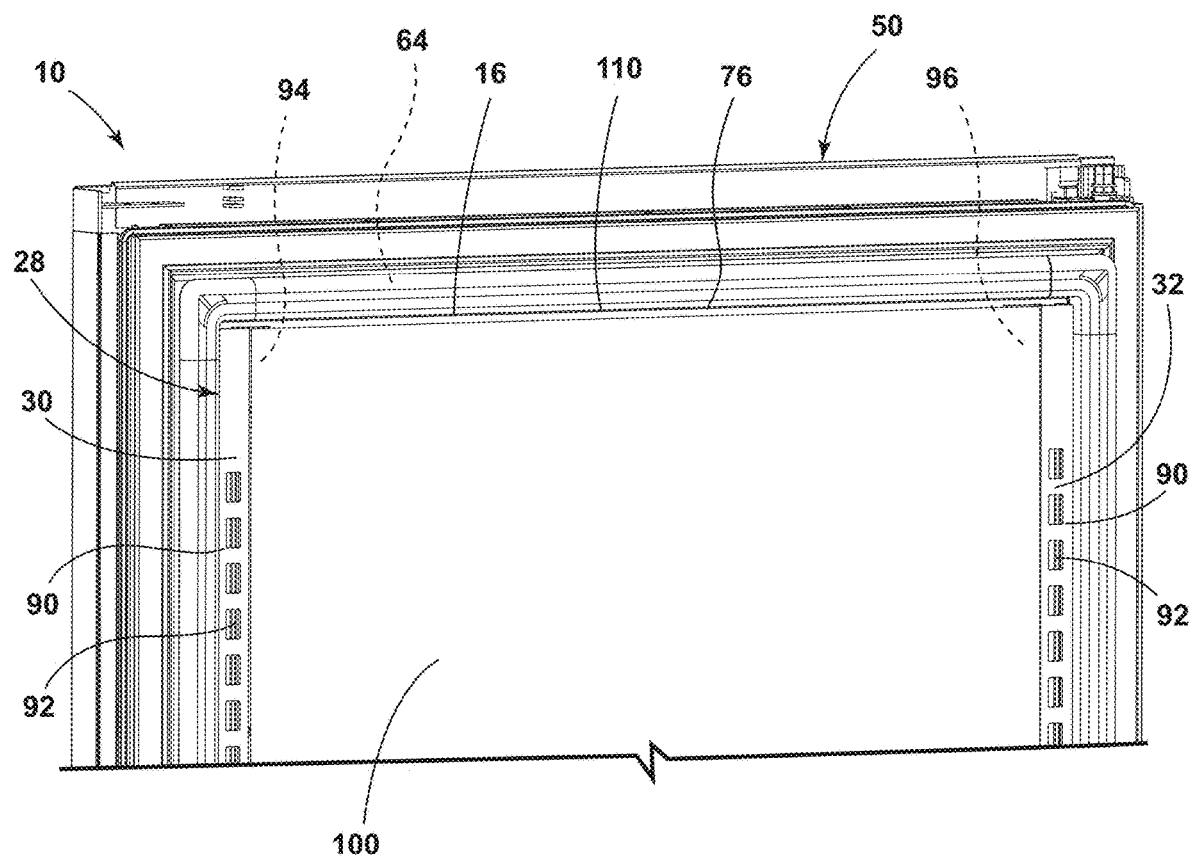
FIG. 5 is an enlarged top perspective view of the insulated structure of FIG. 4 taken at area V.
Figure 6:
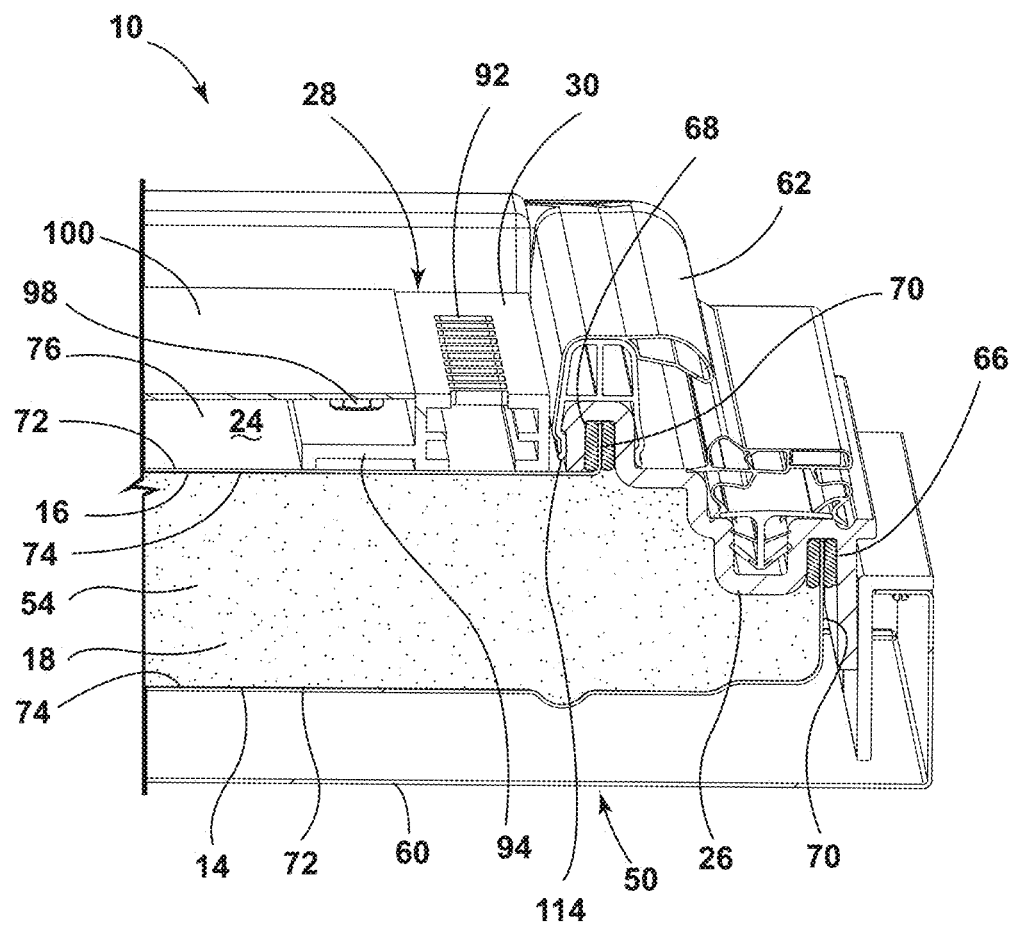
FIG. 6 is a partial cross-sectional view of an attachment assembly and the insulated structure of FIG. 4 taken at line VI-VI.

With further reference to FIGS. 3-6, the attachment assembly 28 is coupled to the attachment surface 24 of the second panel 16. The attachment assembly 28 as described herein includes the first and second attachment features 30, 32, which each include a body 90 and define a plurality of apertures 92 along the body 90. The attachment assembly 28 as illustrated in FIGS. 4-6 includes first and second coupling extensions 94, 96 that extend from the first and second attachment features 30, 32, respectively. The first and second coupling extensions 94, 96 each include a plurality of fasteners 98, described in more detail below. It is generally contemplated that the first and second attachment features 30, 32 extend along a length L (FIG. 7) of the second panel 16. Stated differently, the first and second attachment features 30, 32 are disposed along a vertical extent of the second panel 16. Additionally or alternatively, the first and second attachment features 30, 32 may extend along any portion of the length L of the second panel 16.

A false panel 100 may be coupled to the door 50 to further define the inner portion 58 of the door 50. The false panel 100 may be formed from any practicable material including, but not limited to, metal, plastics, and other practicable materials for lining an insulated door. The false panel 100 can be coupled to the fasteners 98 disposed along the first and second coupling extensions 94, 96 of the attachment assembly 28. It is generally contemplated that the false panel 100 may approximately abut the first and second attachment features 30, 32 to define a coplanar configuration. Stated differently, the false panel 100 can be coplanar with the attachment assembly 28 to define the inner portion 58 of the door 50. Additionally or alternatively, the false panel 100 may at least partially extend past a portion of the first and second attachment features 30, 32 to partially conceal the first and second attachment features 30, 32 along the inner portion 58 of the door 50.

The bin 34 (FIG. 1) can extend along the false panel 100 and couple to the first and second attachment features 30, 32 to lay in a single plane along the door 50. The coplanar configuration of the attachment assembly 28 and the false panel 100 may provide additional stability for the bin 34 along the inner portion 58 of the door 50, such that rattling or other movement of the bin 34 relative to the door 50 may be minimized. As described in more detail below, other configurations of the attachment assembly 28 further assist in stabilizing the bin 34 relative to the inner portion 58 of the door 50 as a result of the configuration of the first and second attachment features 30, 32.

Figure 7:
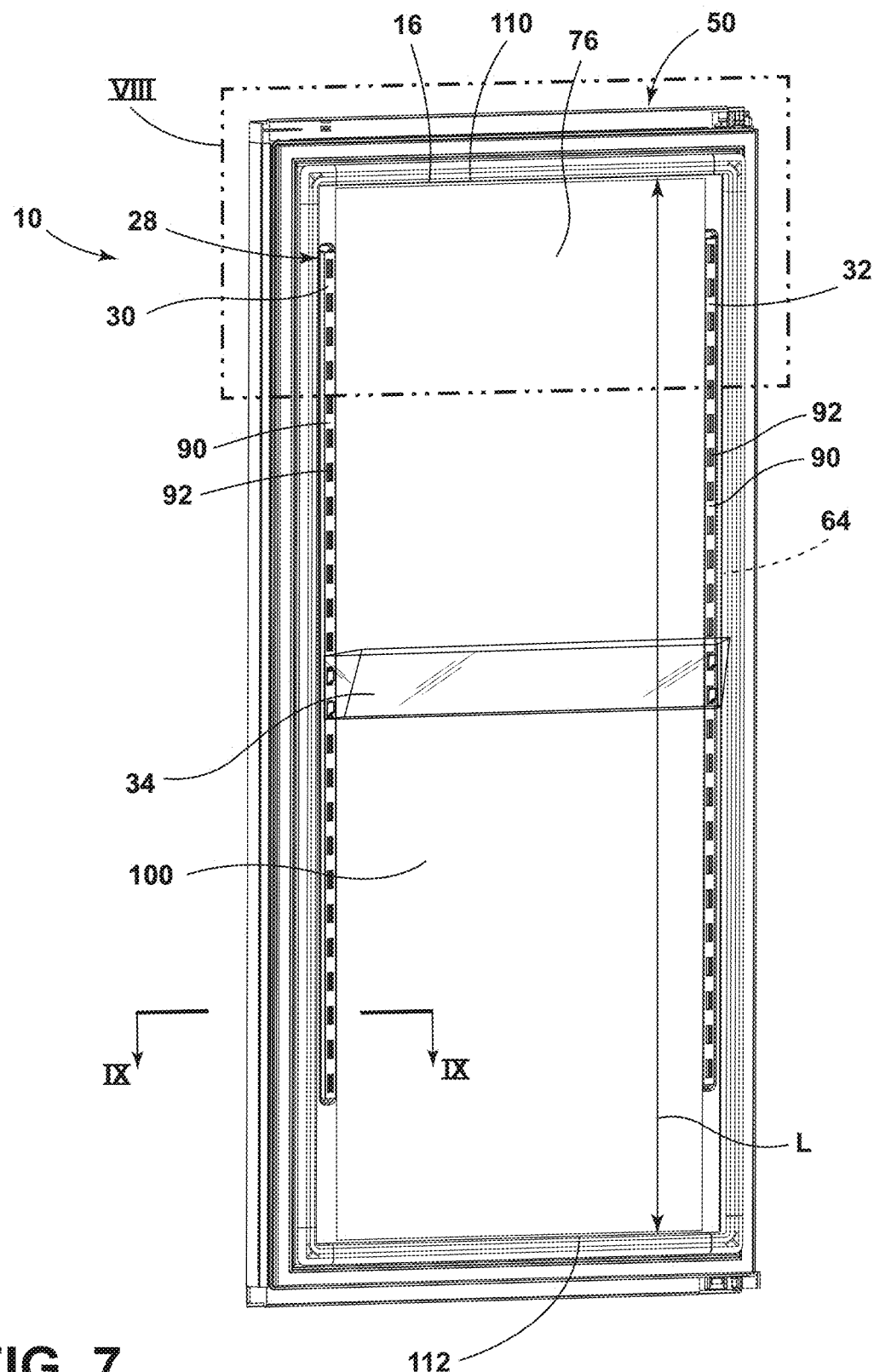
FIG. 7 is a top perspective view of an insulated structure of the present disclosure in a door and with an attachment assembly of the present disclosure.
Figure 8:
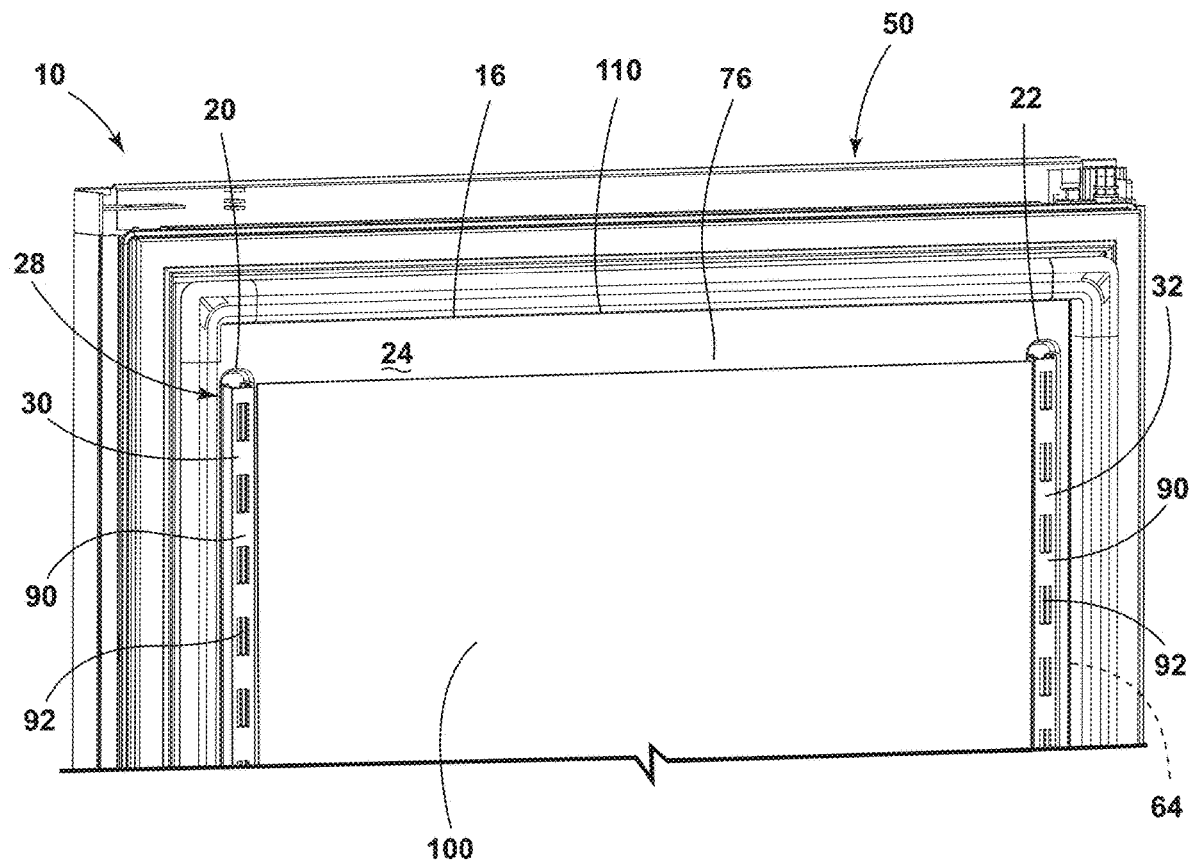
FIG. 8 is an enlarged top perspective view of the insulated structure of FIG. 7 taken at area VIII.
Figure 9:
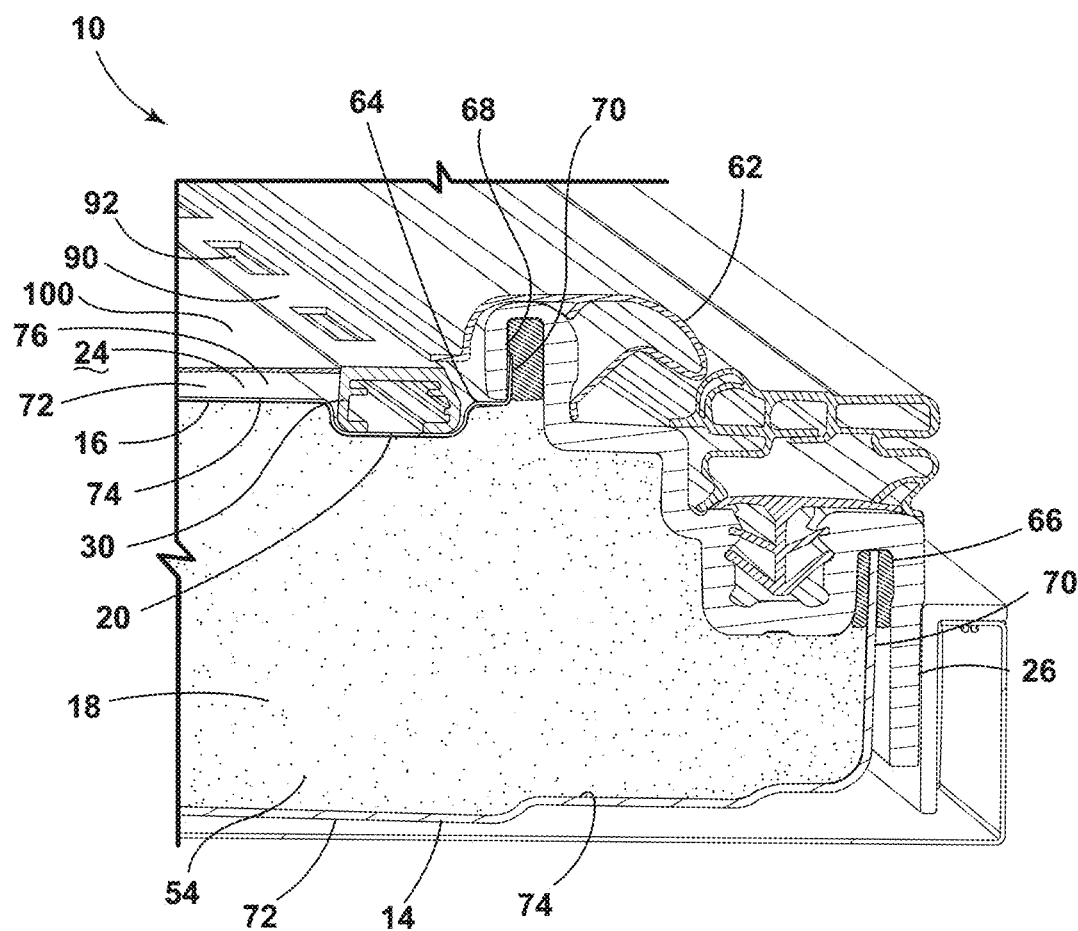
FIG. 9 is a partial cross-sectional view of an attachment assembly and the insulated structure of FIG. 7 taken at line IX-IX.

Referring now to FIGS. 7-9 and as mentioned above, the second panel 16 can define the first and second channels 20, 22 along the first side 72 of the second panel 16. Stated differently, the first and second channels 20, 22 may be defined along the length L of the second panel 16 and are recessed into the first side 72 of the second panel 16. The first and second channels 20, 22 of the second panel 16 may be configured to be generally shallow relative to the central portion 76. Stated differently, the first and second channels 20, 22 may be referred to as shallow channels 20, 22. In this configuration, each of the first and second attachment features 30, 32 may be disposed within the first and second channels 20, 22, respectively. It is generally contemplated that the first and second attachment features 30, 32 may at least partially extend from the first and second channels 20, 22, respectively, as a result of the shallow depth of the first and second channels 20, 22. Stated differently, the attachment assembly 28 may outwardly extend from the first and second channels 20, 22, past the central portion 76 of the second panel 16 as a result of the shallow configuration of the channels 20, 22, such that the first and second attachment features 30, 32 are raised relative to the central portion 76.

In this configuration, it is generally contemplated that the false panel 100 may be operably coupled to the attachment assembly 28 and disposed over the central portion 76 of the second panel 16. For example, the false panel 100 may extend over the central portion 76 and couple to each of the first and second attachment features 30, 32. By way of example, not limitation, the false panel 100 may hook or otherwise be coupled within the apertures 92 defined by the body 90 of each of the attachment features 30, 32. Additionally or alternatively, the false panel 100 may be coupled to the central portion 76 of the second panel 16, such that the false panel 100 is adjacent to the attachment assembly 28. For example, the false panel 100 may be adhered to the central portion 76 to be generally coplanar with the attachment assembly 28. As discussed above, the coplanar configuration assists in stabilizing the bin 34 (FIG. 1). The shallow channels 20, 22 are advantageous as the channels 20, 22 assist in the positioning of the attachment assembly 28 while minimizing any potential strain on the second panel 16, as described in more detail below.

Figure 10:
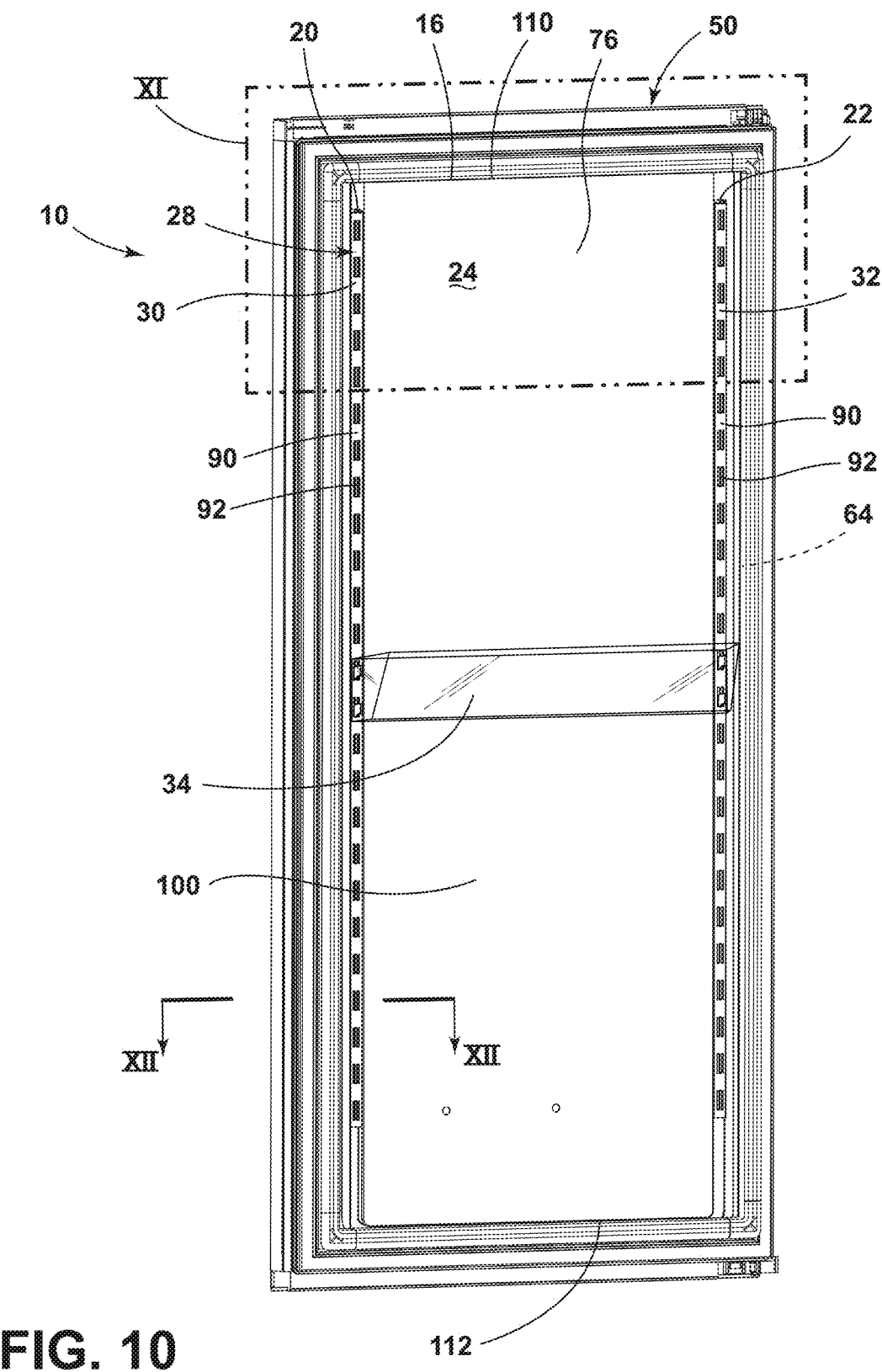
FIG. 10 is a top perspective view of an insulated structure of the present disclosure in a door and with an attachment assembly of the present disclosure.
Figure 11:
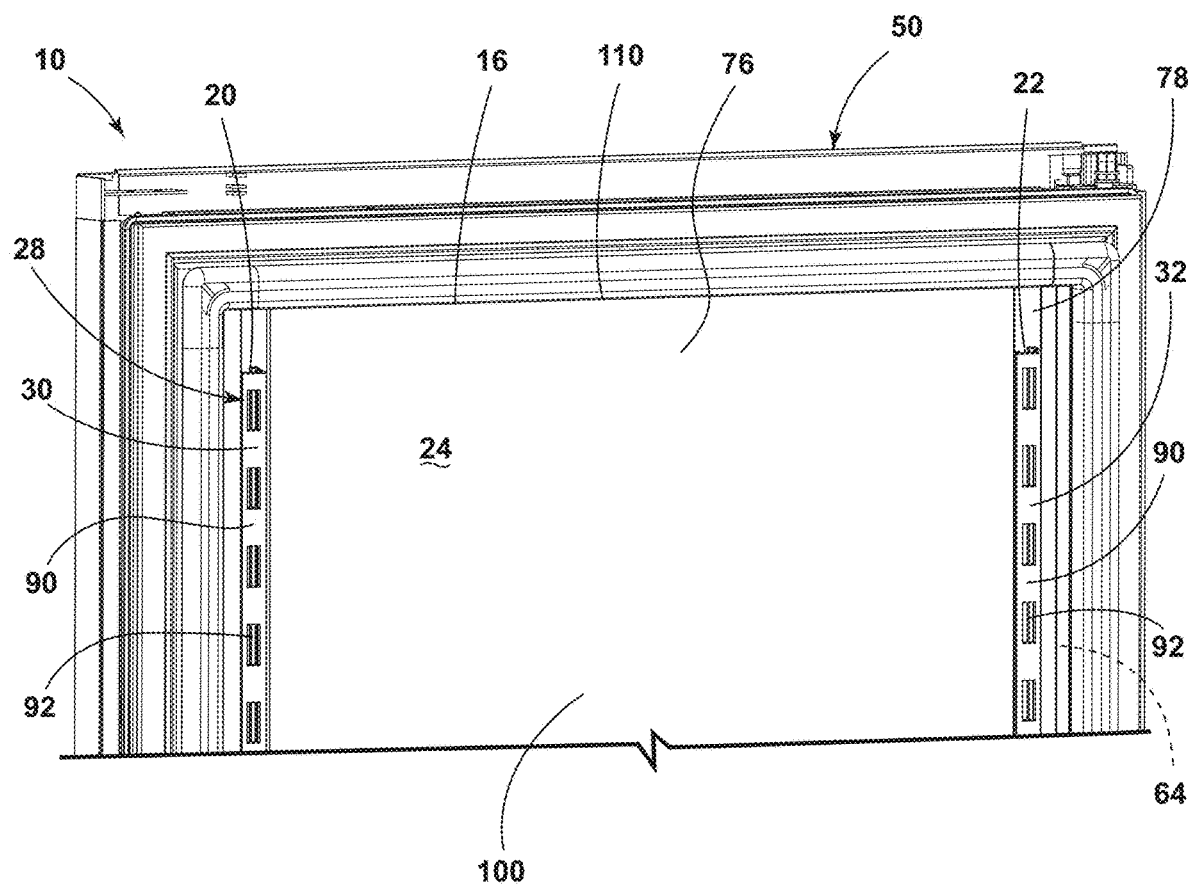
FIG. 11 is an enlarged top perspective view of the insulated structure of FIG. 10 taken at area XI.
Figure 12:
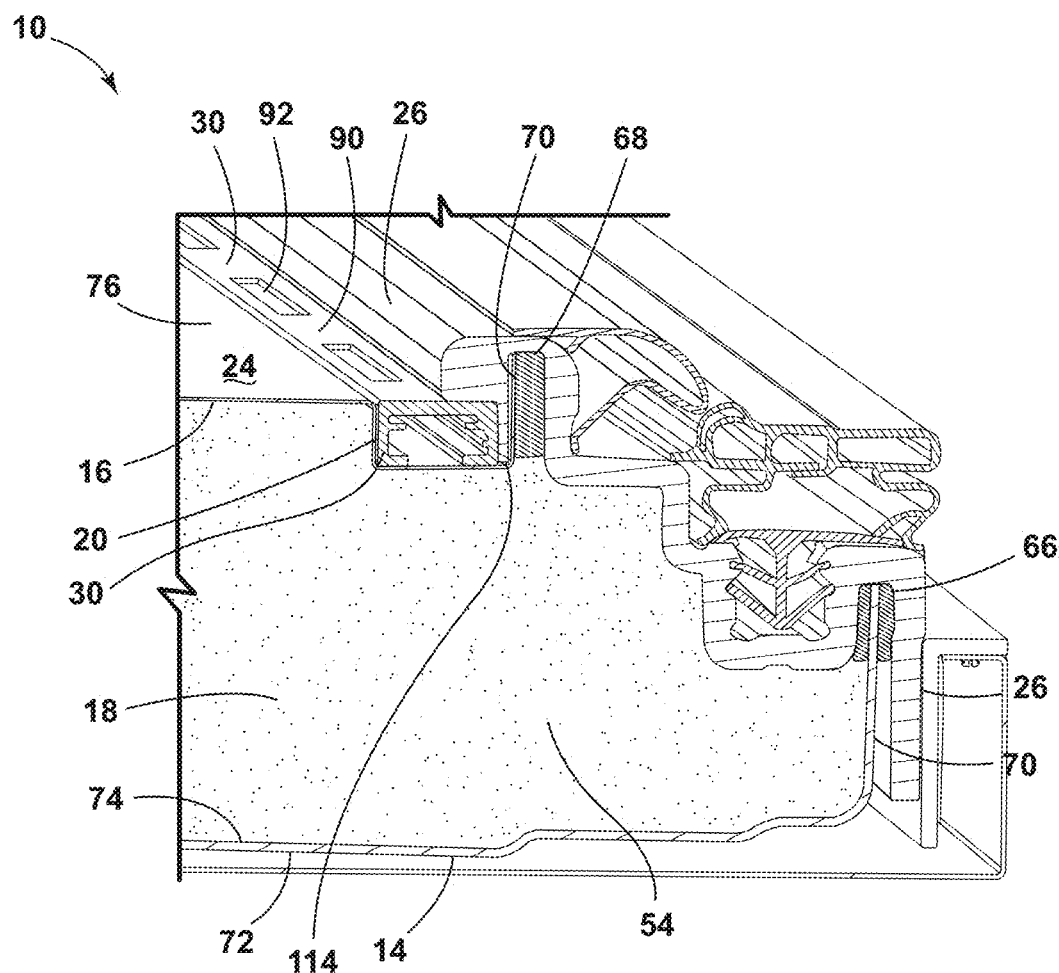
FIG. 12 is a partial cross-sectional view of an attachment assembly and the insulated structure of FIG. 10 taken at lines XII-XII.

Referring now to FIGS. 10-12, the first channel 20 and the second channel 22 can extend around the perimeter 64 of the second panel 16 to define the perimeter channel 78 of the second panel 16. Stated differently, the first and second channels 20, 22 extend around a top portion 110 and a bottom portion 112 of the second panel 16 to define the perimeter channel 78. The perimeter channel 78 is recessed relative to the central portion 76 and the peripheral flange 70 of the second panel 16. It is generally contemplated that the perimeter channel 78 may have a consistent depth along the perimeter 64 of the second panel 16.

For example, the perimeter channel 78 may have a depth D that is approximately equal to the thickness of each of the first and second attachment features 30, 32. Stated differently, the first and second attachment features 30, 32 may be disposed within the peripheral channel 78 and be coplanar with the central portion 76 of the attachment surface 24. The first and second attachment features 30, 32 are contemplated to be laterally disposed within the peripheral channel 78, such that each may be said to be disposed within the first and second channels 20, 22, respectively. It is also contemplated that the attachment features 30, 32 may be additionally or alternatively disposed within the perimeter channel 78 along the top and bottom portions 110, 112 of the second panel 16.

It is further contemplated that the attachment assembly 28 may be configured as a single body 90 that can be disposed within the perimeter channel 78. In this alternate configuration, the trim breaker 26 may be at least partially disposed over a portion of the attachment assembly 28 to at least partially conceal the attachment assembly 28. As described below, the trim breaker 26 is coupled to the peripheral flange 70 proximate to the attachment assembly 28, such that only a portion of the trim breaker 26 may overlap with the attachment assembly 28. Additionally or alternatively, the attachment assembly 28 may be free from overlap with the trim breaker 26. In any one of these configurations, the attachment assembly 28 is coplanar with the central portion 76 of the attachment surface 24. The coplanar configuration may assist in stabilizing the second panel 16 when the bin 34 (FIG. 1) is attached to the door 50. Further, the positioning of the attachment assembly 28 within the first and second channels 20, 22 may assist in stabilizing the overall structure of the second panel 16. The configuration illustrated in FIGS. 10-12 is generally free from the false panel 100 as the attachment assembly 28 is coplanar with the central portion 76.

As illustrated in FIG. 12, the first attachment feature 30 is coupled to the second panel 16 within the first channel 20 proximate to the central portion 76. The first attachment feature 30 generally defines a space 114 between the body 90 of the first attachment feature 30 and the peripheral flange 70 of the second panel 16. The trim breaker 26 can be disposed within the space 114 defined between the attachment feature 30 and the peripheral flange 70 when defining the insulated structure 10 (FIG. 2). As mentioned above, the positioning of the attachment assembly 28 within the first and second channels 20, 22 defines a generally planar configuration between the attachment assembly 28 and the central portion 76 of the second panel 16.

Figure 13:
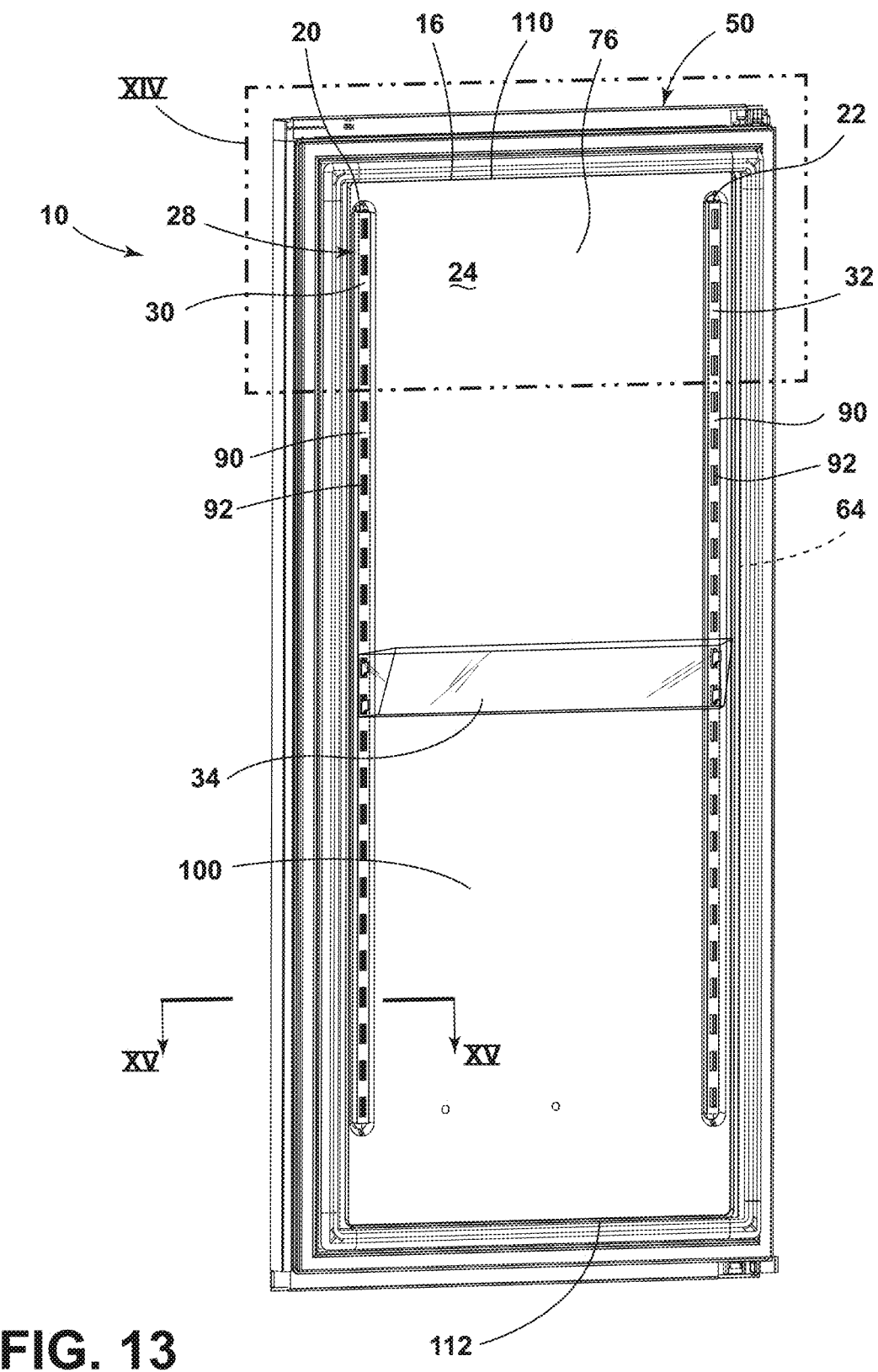
FIG. 13 is a top perspective view of an insulated structure of the present disclosure in a door and with an attachment assembly of the present disclosure.
Figure 14:
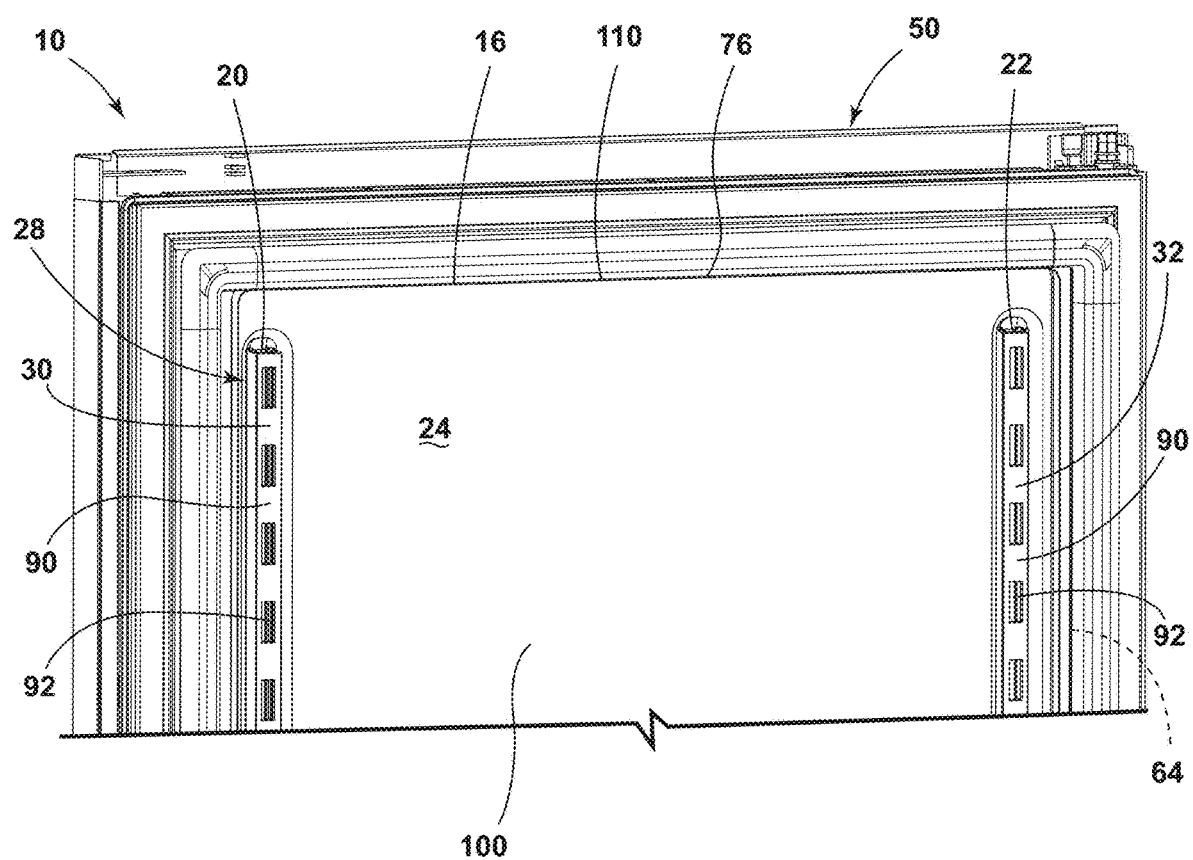
FIG. 14 is an enlarged top perspective view of the insulated structure of FIG. 13 taken at area XIV.
Figure 15:
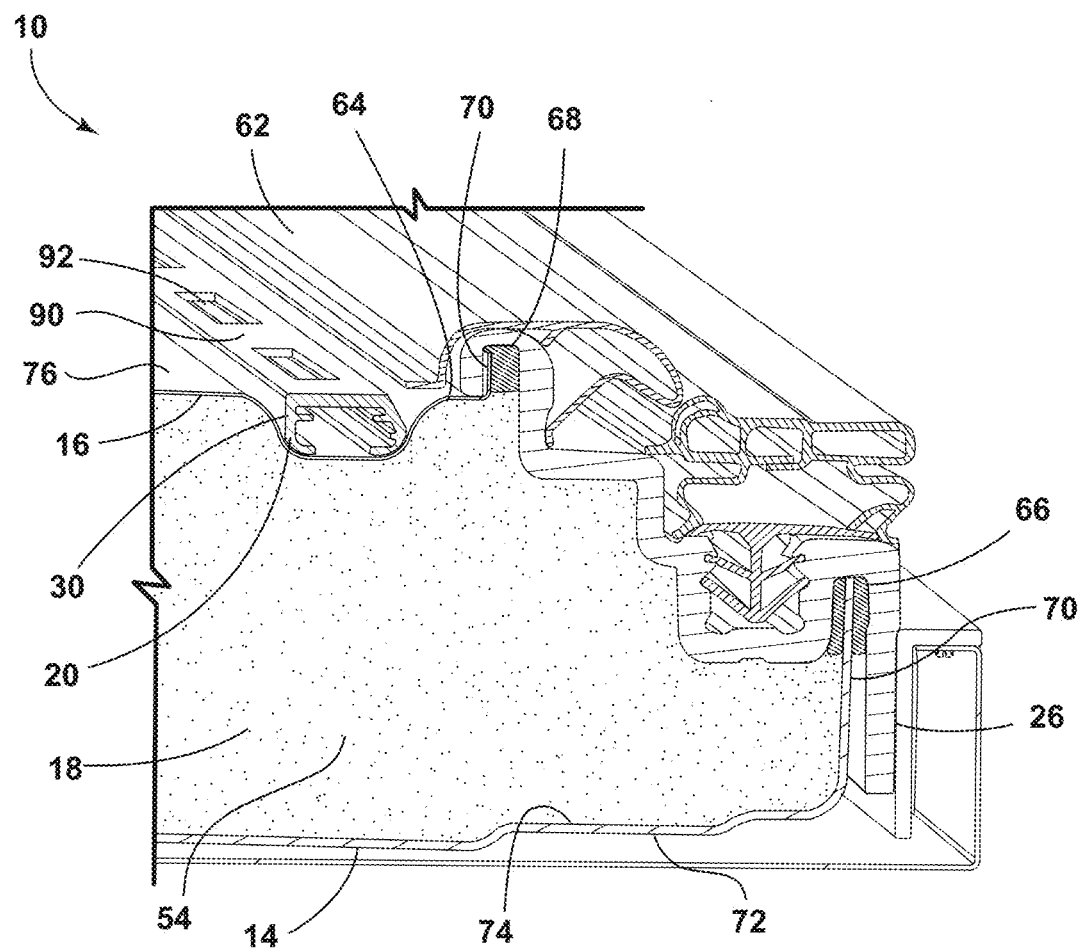
FIG. 15 is a partial cross-sectional view of an attachment assembly and the insulated structure of FIG. 13 taken at lines XV-XV.

Referring now to FIGS. 13-15, the first and second channels 20, 22 are laterally defined along the second panel 16, and the first and second attachment features 30, 32 are disposed within the first and second channels 20, 22. As similarly discussed with respect to FIGS. 13-15, it is generally contemplated that the attachment assembly 28 is generally coplanar with the central portion 76 of the second panel 16. The peripheral flange 70 of the second panel 16 extends proximate to the first and second channels 20, 22 and around the perimeter 64 of the second panel 16. In this alternate configuration, the first and second attachment features 30, 32 are disposed within the first and second channels 20, 22 and are generally free from the space 114 (FIG. 13). The trim breaker 26 is disposed proximate to the attachment assembly 28 and along the peripheral flange 70 exterior to the attachment assembly 28.

The separation of the first and second channels 20, 22 from the peripheral flange 70 minimizes potential interference with the trim breaker 26 during assembly of the insulated structure 10 (FIG. 2). In this alternate configuration the first and second channels 20, 22 may assist in stiffening the second panel 16. For example, the channels 20, 22 may increase the overall rigidity of the central portion 76 and may assist in minimizing flexion of the second panel 16 after assembly. The attachment assembly 28 may further assist in increasing the stability of the second panel 16 once assembled within the first and second channels 20, 22.

Referring again to FIGS. 1-15, the various configurations of the attachment assembly 28 with the insulated structure 10 maximizes the overall construction efficiency while minimizing the strain placed on the second panel 16 after assembly. The first and second channels 20, 22 may further assist in the stabilization of the second panel 16 and may be configured as either shallow or as having the same depth as the first and second attachment features 30, 32. It is further contemplated that the attachment assembly 28 may be disposed directly on the attachment surface 24 to minimize any alteration of the second panel 16. In some of the configurations, the addition of the false panel 100 may assist in maintaining a coplanar configuration of the attachment assembly 28 with the inner portion 58 of the door 50. The coplanar configuration further assists in stabilizing the bin 34 once coupled to the attachment features 30, 32. Any one of these configurations may be advantageously utilized to maximize the efficiency of the insulated structure 10 as a result of minimized distortion of the second panel 16 and maximized stability of the both the second panel 16 and the bin 34.

The invention disclosed herein is further summarized in the following paragraphs and is further characterized by combinations of any and all of the various aspects described therein.

According to one aspect of the present disclosure, a vacuum insulated structure for an appliance includes a wrapper and a liner that is operably coupled to the wrapper to define an insulation cavity. The liner defines a first channel and a second channel along an attachment surface of the liner. The vacuum insulated structure further includes a trim breaker that is coupled to the liner and the wrapper to further define the insulation cavity, and an attachment assembly that is operably coupled to the attachment surface of the liner proximate the trim breaker. The attachment assembly includes a first attachment feature that is disposed within the first channel and a second attachment feature that is disposed within the second channel. A bin is operably coupled to the liner via the attachment assembly.

According to another aspect, a first attachment feature and a second attachment feature are disposed along a vertical extent of a liner.

According to another aspect, a trim breaker is at least partially disposed over an attachment assembly.

According to another aspect, a first attachment feature and a second attachment feature are raised relative to a central portion of a liner.

According to another aspect, a vacuum insulated structure further includes a false panel that is operably coupled to at least a portion of an attachment assembly. The attachment assembly is coplanar with the false panel and a bin is selectively coupled to the attachment assembly proximate the false panel.

According to another aspect, a false panel at least partially conceals a portion of an attachment assembly.

According to another aspect, a first channel and a second channel extend around a perimeter of a liner to define a perimeter channel of the liner.

According to another aspect of the present disclosure, an insulated structure includes a door that has a liner and a wrapper. The liner defines at least one channel. At least one attachment feature is disposed within the at least one channel defined by the liner and coupled to the door. The at least one attachment feature includes a body that has a plurality of apertures that are defined along a length of the body. A bin is operably coupled to the door via the at least one attachment feature. The bin includes a coupling feature that extends through at least one of the plurality of apertures that are defined by the body.

According to another aspect, a door includes a trim breaker that is operably coupled to a liner and a wrapper. The trim breaker is at least partially disposed over at least one attachment feature.

According to another aspect, at least one channel includes a first channel and a second channel. At least one attachment feature includes a first attachment feature that is disposed with the first channel and a second attachment feature that is disposed with the second channel.

According to another aspect, an insulated structure further includes a false panel that is operably coupled to at least one attachment feature. The false panel is coplanar with the at least one attachment feature and a bin is coupled to the at least one attachment feature proximate the false panel.

According to another aspect, at least one channel is a perimeter channel that is defined along a perimeter of a liner, and at least one attachment feature is disposed within the perimeter channel.

According to another aspect, a door has a central portion, and at least one attachment feature is coplanar with the central portion of the door.

According to yet another aspect of the present disclosure, an insulated door includes a first panel, a second panel that is operably coupled to the first panel to define an insulation cavity, a trim breaker that is coupled to the first panel and the second panel, and an attachment feature that is operably coupled to the second panel adjacent the trim breaker. The attachment feature has a body and defines a plurality of apertures along the body. The insulated door further includes a false panel that is operably coupled to the attachment feature and is configured to at least partially conceal the second panel.

According to another aspect, a trim breaker is at least partially positioned over and coupled to an attachment feature.

According to another aspect, an attachment feature is coplanar with a central portion of a second panel.

According to another aspect, an insulated door further includes a bin that is operably coupled to an attachment feature proximate a trim breaker.

According to another aspect, a second panel defines a channel, and an attachment feature is disposed within the channel.

According to another aspect, a channel defined by a second panel is a shallow channel, and an attachment feature is disposed within the shallow channel and is coplanar with a false panel.

According to another aspect, a false panel at least partially conceals an attachment feature.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated structure for an appliance, comprising:
   a wrapper;
   a liner operably coupled to the wrapper to define an insulation cavity, the liner defining a first channel and a second channel along an attachment surface of the liner;
   a trim breaker coupled to the liner and the wrapper to further define the insulation cavity, the trim breaker having a first receiving portion that receives a perimetrical flange of the wrapper and having a second receiving portion that receives a perimetrical flange of the liner;
   an attachment assembly operably coupled to the attachment surface of the liner proximate the trim breaker, the attachment assembly including a first attachment feature disposed within the first channel and a second attachment feature disposed within the second channel, wherein a portion of the trim breaker proximate the second receiving portion is at least partially disposed over the attachment assembly; and
   a bin operably coupled to the liner via the attachment assembly.

2. The vacuum insulated structure of claim 1, wherein the first attachment feature and the second attachment feature are disposed along a vertical extent of the liner.

3. The vacuum insulated structure of claim 1, wherein the first attachment feature and the second attachment feature are raised relative to a central portion of the liner.

4. The vacuum insulated structure of claim 3, further comprising:
   a false panel operably coupled to at least a portion of the attachment assembly, wherein the attachment assembly is coplanar with the false panel and the bin is selectively coupled to the attachment assembly proximate the false panel.

5. The vacuum insulated structure of claim 4, wherein the false panel at least partially conceals the portion of the attachment assembly.

6. The vacuum insulated structure of claim 1, wherein the first channel and the second channel extend around a perimeter of the liner to define a perimeter channel of the liner.

7. The vacuum insulated structure of claim 1, wherein the attachment assembly is coplanar with a central portion of the liner.

8. An insulated structure, comprising:
   a door having a liner and a wrapper, the liner defining at least one channel;
   a trim breaker that extends between the liner and the wrapper, the trim breaker having a first receiving portion that receives a perimetrical flange of the wrapper and having a second receiving portion that receives a perimetrical flange of the liner;
   at least one attachment feature disposed within the at least one channel defined by the liner and coupled to the door, the at least one attachment feature including a body having a plurality of apertures defined along a length of the body, wherein a portion of the trim breaker cooperates with the liner to define the at least one channel; and
   a bin operably coupled to the door via the at least one attachment feature, the bin extending through at least one of the plurality of apertures defined by the body.

9. The insulated structure of claim 8, wherein the trim breaker is at least partially disposed over the at least one attachment feature.

10. The insulated structure of claim 8, wherein the at least one channel includes a first channel and a second channel, and wherein the at least one attachment feature includes a first attachment feature disposed within the first channel and a second attachment feature disposed within the second channel.

11. The insulated structure of claim 8, further comprising:
   a false panel operably coupled to the at least one attachment feature, wherein the false panel is coplanar with the at least one attachment feature and the bin is coupled to the at least one attachment feature proximate the false panel.

12. The insulated structure of claim 8, wherein the at least one channel is a perimeter channel defined along a perimeter of the liner, and wherein the at least one attachment feature is disposed within the perimeter channel.

13. The insulated structure of claim 8, wherein the door has a central portion, and wherein the at least one attachment feature is coplanar with the central portion of the door.

14. An insulated door, comprising:
   a first panel;
   a second panel operably coupled to the first panel to define an insulation cavity;
   a trim breaker coupled to the first panel and the second panel, the trim breaker having a first receiving portion that receives a perimetrical flange of the first panel and having a second receiving portion that receives a perimetrical flange of the second panel;
   an attachment feature operably coupled to the second panel adjacent the trim breaker, the attachment feature having a body and defining a plurality of apertures along the body, wherein the trim breaker is at least partially positioned over and coupled to the attachment feature; and
   a false panel operably coupled to the attachment feature and configured to at least partially conceal the second panel.

15. The insulated door of claim 14, wherein the attachment feature is coplanar with a central portion of the second panel.

16. The insulated door of claim 14, further comprising:
   a bin operably coupled to the attachment feature proximate the trim breaker.

17. The insulated door of claim 14, wherein the second panel defines a channel, and wherein the attachment feature is disposed within the channel.

18. The insulated door of claim 17, wherein the channel defined by the second panel is a shallow channel, and wherein the attachment feature is disposed within the shallow channel and is coplanar with the false panel.

19. The insulated door of claim 14, wherein the false panel at least partially conceals the attachment feature.

20. The insulated door of claim 14, wherein the trim breaker and the second panel cooperate to define a channel that receives the attachment feature.

* * * * *